March 10, 1970  H. G. JOHNSON  3,499,188
APPARATUS FOR FORMING HOLLOW ARTICLES
OF COLD-STRENGTHENABLE MATERIALS
Filed Dec. 13, 1966  4 Sheets-Sheet 1

INVENTOR.
HERBERT G. JOHNSON

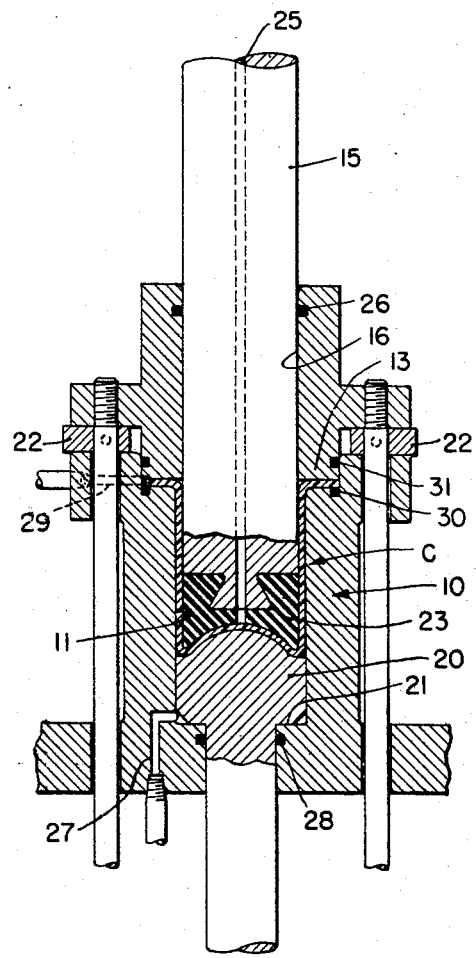
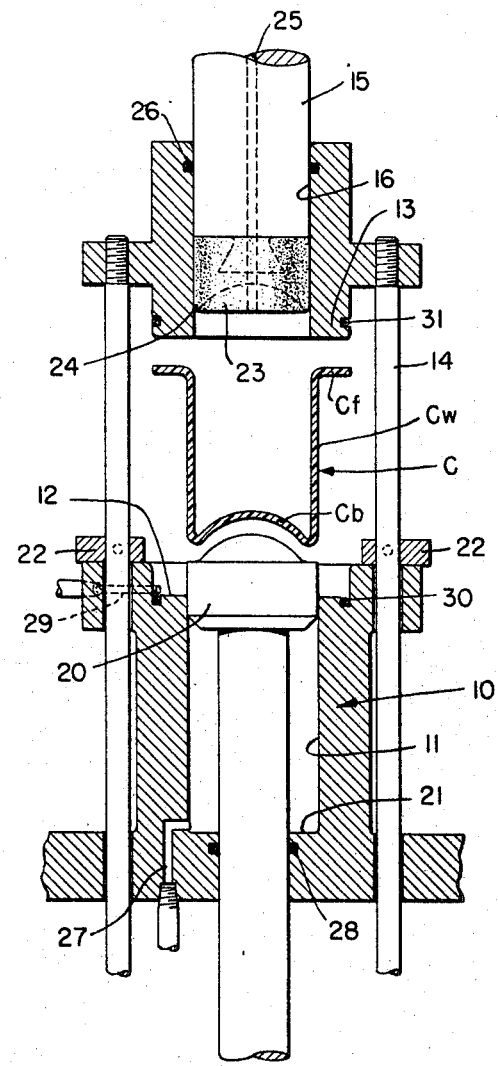
Fig.3
Fig.4
INVENTOR.
HERBERT G. JOHNSON

INVENTOR.
HERBERT G. JOHNSON

United States Patent Office 3,499,188
Patented Mar. 10, 1970

3,499,188
APPARATUS FOR FORMING HOLLOW ARTICLES OF COLD-STRENGTHENABLE MATERIALS
Herbert G. Johnson, Havertown, Pa., assignor to Shell Oil Company, New York, N.Y., a corporation of Delaware
Filed Dec. 13, 1966, Ser. No. 601,380
Int. Cl. B29c 17/02
U.S. Cl. 18—19                          7 Claims

ABSTRACT OF THE DISCLOSURE

This application discloses method and apparatus for stretch-forming flanged hollow articles of cold-work-strengthenable plastic material, particularly polymer plastic material, particularly polymer plastic material, and the article made thereby wherein a female die unit with a tubular portion has an annular (but not necessarily always circular) peripherally confined blank-holding recess seat at one end, the female die unit being formed of separable parts, when desired; wherein independently power-actuated rim clamping means having axial movement clamp a rim portion of the blank securely in said recess seat against pull-in and with the added function of squeezing inventory material of the rim inwardly, when desired; and wherein an independently power-actuated axially movable article forming plunger moves through said clamping means, preferably being guided thereby and sealed, to force the unclamped inner portion of the blank through the female die unit to pull bottom inventory material radially outward without extrusion action to form the sidewall of the article.

An opposed independently power-actuated axially movable bottom plunger is provided to act against the bottom of the blank to control its shape during and at the end of the forming action and, if desired, to eject the formed article. Means are provided for supplying or removing fluid from one or both sides of the blank to assist the flow of material and in ejection of the article, when desired. The arrangement of the rim clamping means relative to the sidewall of the tubular portion of the female die unit and the shape of the forming plunger assist in the flow of material and in establishing the desired thickness of the sidewall of the article.

Means are also provided for biaxially working the material in the rim, as by circumferential movement of pressure means acting thereon.

Background of the invention

This invention relates to apparatus for forming hollow articles of cold-strengthenable materials and has for an object the provision of improvements in this art.

The invention is applicable to various plastic materials, such as plastic polymers and certain metals, but is particularly applicable to plastics of the kind which can be strengthened by solid-working them at temperatures below their fusing points. For this reason the term "cold-working" as used herein for convenience might more precisely be termed "solid-working"; but since the effects are similar to those produced by cold-working of various metals and since "cold-working" is coming to be applied to all such solid-state strengthening phenomena, that term will be used herein, although certain plastics are subject to strentgh improvement by working at relatively high temperatures, as for example, several hundred degrees F. for PTFE (polytetrafluoroethylene), one of the better known fluorocarbon polymers. Some of the synthetic plastics which are suitable for use under the present invention are fluorocarbon polymers, polyamides, polyesters, polystyrenes, polyolefins, and polypropylenes. Polypropylenes, in particular, are subject to strength improvement to a remarkable degree by solid working procedures, either in one axis or another or biaxially. The present invention provides for strengthening in the axis or axes preferred as may be most suitable for the article produced.

According to the present invention a method and apparatus are provided for making a hollow article from a flat sheet blank in a single continuous procedure.

The blank may be referred to as a sheet, plate, billet, or disk. In the simplest aspect of the invention, the outer edge of a blank is gripped around the periphery or rim by an annular blank holding or clamping means and the thick inner portion is elongated by a central forming plunger through an annular orifice which when desired is arranged to be radially thinner than the blank and as thick radially as the thickest part of the sidewall of the container to be formed, to form a hollow article having a reduced top flange thickness and a sidewall which has been solid-worked by controlled stretching ahead of the forming plunger.

In a specific aspect, the inner edge of the clamping means overhangs the sidewall of the tubular portion of the female die unit at the recess seat and closely fits and guides the forward end and body of the forming plunger relative ot the female die unit to provide an annular—not necessarily circular—orifice which defines the maximum thickness of the sidewall of the forming article. This means, as shown in the drawings, that the width of the orifice is less than the depth of the recess of the seat, and, in desired cases, of less width than the thickness of the blank. Means are provided for controlling the feed-out of inventory material from beneath the forming plunger during formation of the article, as by supplying to or removing fluid from one or both sides of the blank, the use of fluid also providing means to assist in removing the formed article, when desired.

The bottom may be further worked and shaped between the forming plunger and a cooperating reaction member at the end of the body-forming stroke, the thickness of the bottom depending on the length of the side-forming stroke as related to the original thickness of the blank, the size of the annular die orifice, and other factors, such as relative friction with the forming die and the like, to be discussed hereinafter.

As another aspect of the invention, the blank-holder-gripped portion or periphery of the blank and the bottom may be retained with the sidewall portion to form a closed-bottom container with a top-strengthening rim; or the tubular worked portion may be cut off from the rim and bottom and used as a tube, especially when it has been drawn out to considerable length as is possible by the present procedure and apparatus.

As another aspect of the invention, the rim is compressed, as by axial or radial forces, or both, to thin it and force some of its supply or inventory of material into the inner portion of the blank and thereby give the rim and adjacent portions of the article the characteristics of solid-worked material.

An another aspect of the invention, the rim and adjacent sidewall is not only worked axially and radially, but also is caused to flow peripherally so as to acquire biaxial orientation strengthening whereby to overcome the directional weakness characteristic of uniaxial orientation.

As another aspect or object of the invention, the tubular portion may be expanded and shaped to give it greater circumferential strength by a secondary action after initial formation and while the material is still substantially at the same working temperature.

Another object is to provide apparatus which has a rapid working cycle and which delivers the formed article in a convenient manner relative to the location of the machine components.

Another object is to make a laminated or multi-walled article of the same or different layer materials.

Another object is to make a container having a rim with predetermined irregularities on its outer surface, such as projections, indentations, or the like, for screw or snap tops, bails or the like.

The above and other objects of the invention, as well as various features of novelty and advantages, will be apparent from the following description of certain exemplary embodiments, reference being made to the accompanying drawings, wherein:

FIG. 3 is a view like FIG. 1 but showing the article, here a cup-shaped article, in fully formed condition;

FIG. 4 is a view like FIG. 1 but showing the press open and the article ejected;

Figure 1:
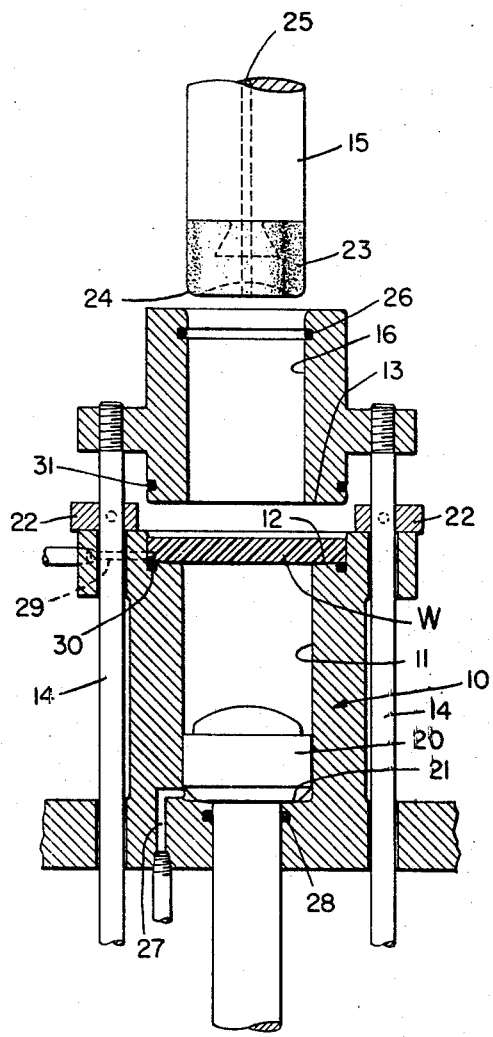
FIG. 1 is an axial section through one form of press apparatus embodying the invention, the parts being shown in retracted position with a sheet blank or billet introduced.

Referring to FIGS. 1 to 4, a forming press comprises a female die unit 10 having a cavity or chamber 11 and an annular seat 12 for a plate-like blank W. An annular rim-clamping plunger 13 is suitably mounted, as on guide rods 14, to enter the enlarged upper portion of the die chamber and clamp the annular outer edge or rim of the blank upon the annular seat 12.

A forming plunger 15 is arranged to move through the inner cylindrical opening 16 of the annular rim plunger 13 to engage the interior portion of the blank W within the outer annular clamped rim portion, an annular space 17 being provided (FIG. 2) between the inner edge of the seat 12 and the outer periphery of the forward end of the forming plunger 15. This annular space 17 is much thinner radially than the original thickness of the blank and approximately the thickness of the thickest part of the sidewall Cw of the container C (FIGS. 3 and 4) which is to be formed. This leaves substantially the entire inner body of the blank beneath the lower end of the plunger as a supply or reservoir of material to be drawn out from beneath the lower end of the plunger to form the sidewall of the container as the forming plunger advances into the forming chamber.

An article ejection plunger 20 is slidably mounted in the die chamber and, if desired, may be raised to engage the lower surface of the blank at the start of the forming operation. However, the upward pressure of the ejection plunger is relatively very slight so that it will have substantially no compression effect on the free outward flow of the blank material from beneath the forming plunger. When the article is fully formed the bottom of the end of the ejection plunger, after being pushed down by the forming plunger with only slight resistance, engages an annular stop seat 21 of the female die (FIG. 3) so as to form the bottom Cb of the article under pressure from the forming plunger.

The rim clamping plunger 13 engages the outer edge of the blank with sufficient axial pressure to hold it securely against pulling out as the article is formed but it may leave the rim at different thicknesses as desired, from substantially the full thickness of the original blank down to a very thin rim. As shown, the rim is left with a thickness about the same as that of the sidewall of the formed container. Stops 22 of any suitable selectable replaceable nature may be provided for limiting the downward movement of the clamping plunger, herein the stop means being shown as insertable washers of selectable thickness.

The pull-out of material from beneath the forming plunger 15 is affected by the shape of the plunger and the relative frictional character of the material-engaging surface of the plunger. The tip 23 of the plunger shown herein (FIGS. 1–4) is of rubber-like material and has a rounded outer edge 24 for the easy flow of material. A fluorocarbon polymer coated plunger end may be desirable. Fluids having a lubricating effect may be used. Here the forming plunger is provided with an axial fluid passage 25, as for air or other desired fluid. An O-ring seal 26 is provided between the forming plunger 15 and the clamping plunger 13 to aid in retaining the fluid. Fluid may be supplied beneath the blank in the forming space past the ejection plunger, as by a chamber duct 27, a retaining O-ring seal 28 being provided around the stem of the ejection plunger.

The pull-out of material from beneath the forming plunger is affected by: (a) the temperature and composition of the material itself; (b) the rate of advance of the forming plunger; (c) the temperature of the forming plunger; (d) its shape; and (e) the frictional character of its material-engaging surface with the material being formed. A PTFE coated plunger has a very low frictional characteristic, especially with low-friction blank material.

Figure 2:
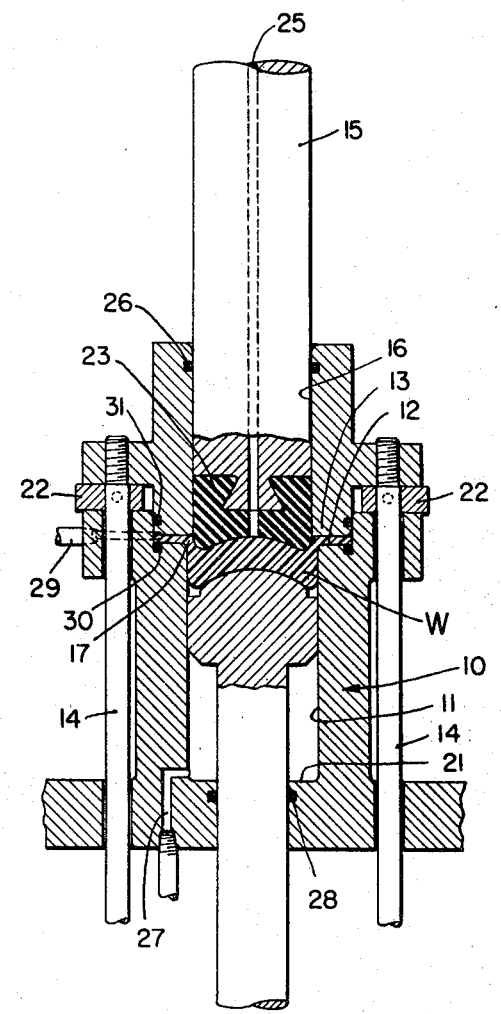
FIG. 2 is a view like FIG. 1 but with an annular blank-holding plunger closed on the blank rim and material of the rim extruded inwardly.

It may also be desirable to supply fluid around the rim of the blank to inhibit sticking and to aid the inward flow of material when compressed by the clamping plunger. For this purpose radial ducts 29 are provided, O-ring seals 30 and 31 being provided to inhibit fluid leakage. This is more important when the article flange Cf is relatively very wide and is to be reduced materially in thickness to supply material to be drawn, as from a second supply or reservoir of material, into the side wall of the container. Preferably, when there is considerable body or reservoir of rim material this is compressed axially and forced inward gradually as the forming plunger moves down to form the sidewall of the container. In the case of FIGS. 1 and 2, where the rim is narrow, the rim material is forced inward before the forming plunger descends. In no case is the outer edge of the blank drawn inward bodily as is done in many sheet metal cupping presses where material of the blank is not much thinned.

Figure 5:
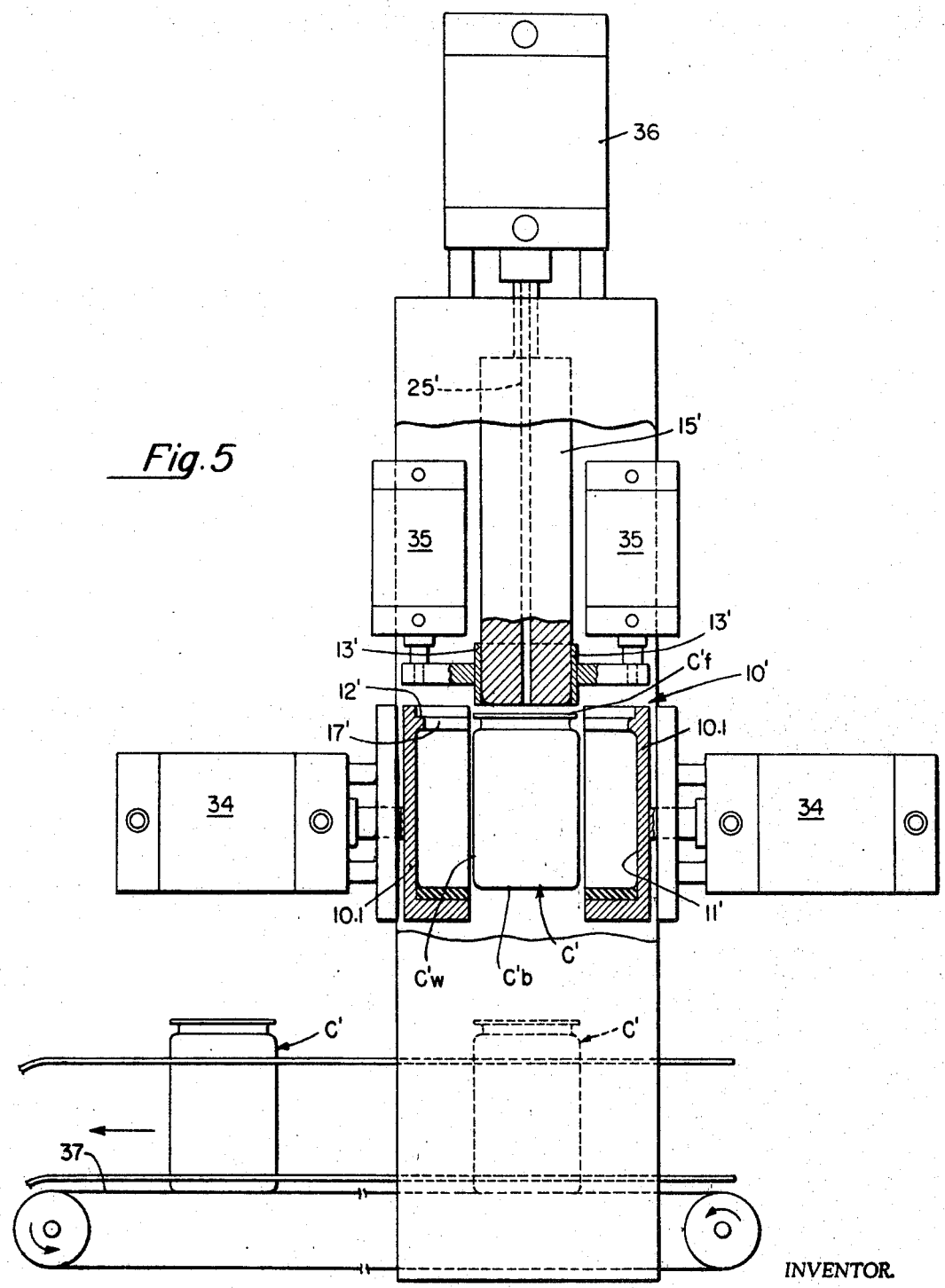
FIG. 5 is a vertical elevation and section of a machine for making re-entry and expanded shapes and ejecting them beneath the forming dies.

FIG. 5 shows a commercial type machine designed for rapid operation. Here the female die unit 10' is formed by laterally separable parts 10.1, 10.1 each operated by a controlled power device 34. The chamber 11' is larger than the initially formed body of the container C' and the sidewalls C'w and bottom C'b of the article are expanded by air through a passage 25' in the forming plunger after the container is initially drawn out. An annular seat 12' is formed for the outer edge of the blank and the container flange C'f when the die parts 10.1 are pushed together.

An annular clamping plunger 13' is actuated in balanced manner by a plurality of power operating devices 35. The forming plunger 15' is actuated by a power device 36. After an article has been drawn down and expanded laterally it is blown down, by continued application of air, upon a transfer device such as a moving belt 37.

By this arrangement the space and time needed for actuation of an ejection plunger are saved, whether the plunger moves vertically, as shown in FIGS. 1–4, or laterally between the separate die parts of FIGURE 5 (not shown) to remove the container to the side while the die parts 10.1 are separated.

The space 17' between the forming plunger and the inside edge of the shoulder of the seat 12' may selectively be restricted, as before, to a thickness much less than that of the original blank and approximately the maximum thickness of the sidewall of the container to be formed so that the body of the blank within the annular clamping plunger is carried down beneath the forming plunger to be drawn out around its curved outer edge to form the sidewall of the container.

The relative friction between the end of the forming plunger and the material will determine, as one factor, the rate of feed-out of material from beneath the plunger.

There is available on the market an oxide-coated and PTFE impregnated material which has a very low coefficient of friction and this has been used with satisfactory results in the present apparatus and method.

Figure 6:
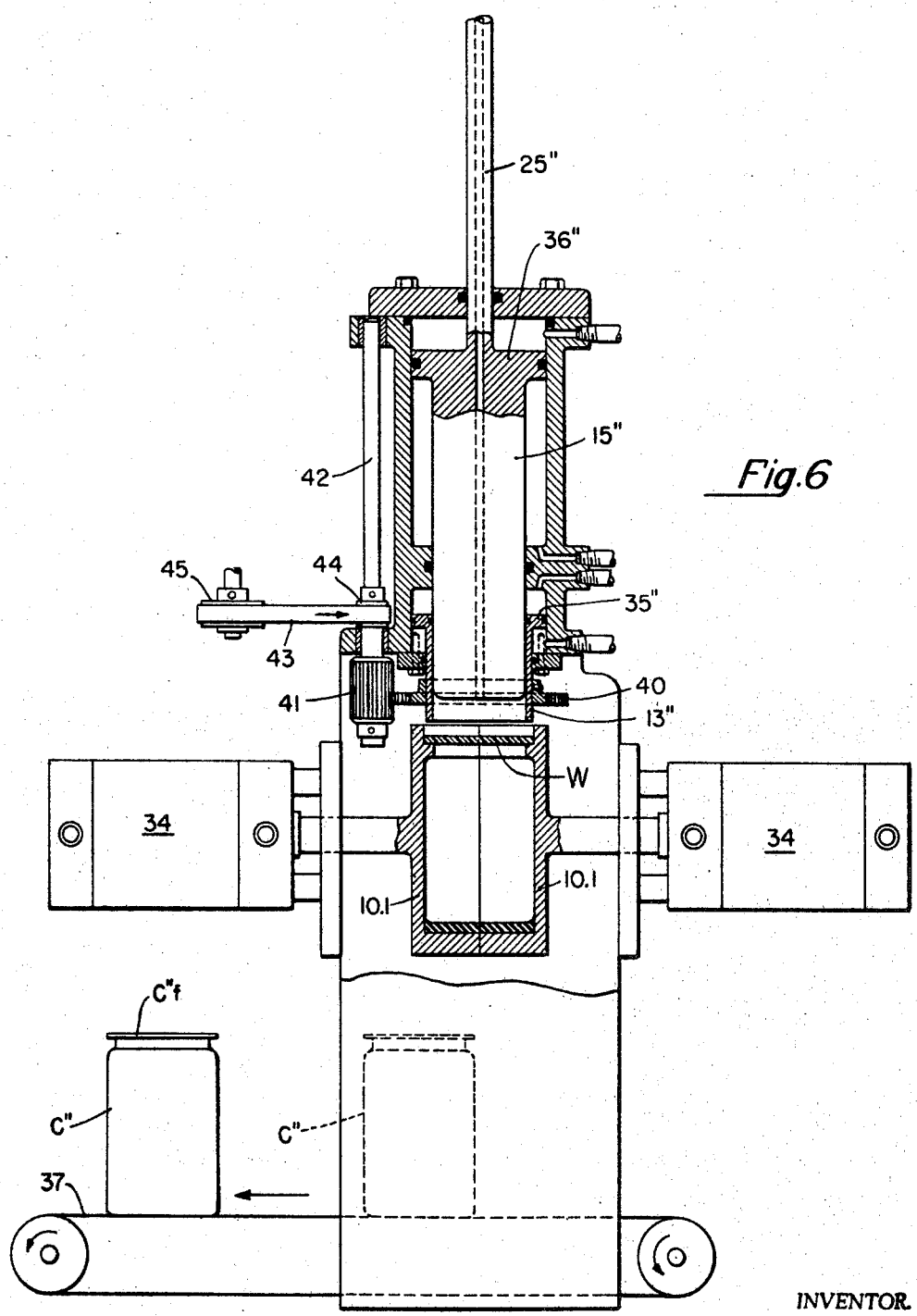
FIG. 6 is a view similar to FIG. 5 but showing means for biaxially orienting the material of the top flange or rim.

FIG. 6 shows apparatus which is similar to that of FIG. 5 but which includes means for biaxially working the material of the flange C″f of the container C″. Here the annular rim-clamping plunger 13″ is provided with means for rotating it to work the material of the rim circumferentially during or after formation, or both.

As shown, the annular clamping plunger 13″ is provided with a ring gear 40 fast thereon which meshes with a splined gear 41 fast on a shaft 42 driven by any suitable means such as by a belt 43 mounted on a shaft pulley 44 and a power shaft pulley 45.

The annular plunger 13″ is operated by an annular power piston 35″ and the forming plunger 15″ is operated by a power piston 36″. The female die is made in laterally separable parts 10.1, 10.1 and operated by power devices 34, as in FIG. 5. Also a take-off belt 37 is provided, as in FIG. 5. A fluid passage 25″ is provided through the forming plunger and its piston to aid in forming or ejecting the article, or both. Other parts, such as ducts, seals and the like shown in FIG. 6 will be understood without detailed description.

The blanks W may be formed of a single homogeneous thickness of material or may consist of laminae of the same or different kinds of material to make containers of a single material, either integral or laminar, or of laminae of different materials selected for the desired characteristics of the container.

The apparatus of FIGS. 5 and 6 is especially suited for making containers with rims having external irregularities, such as projections or depressions, for screw or snap tops, bails or the like, the separable parts of the die providing ready release for such shapes after their formation in the die parts when closed together.

Up to the present time polypropylene, polyethylenes, fluorocarbon polymers, and the like, have been formed into articles by the present method and apparatus, but it will be understood that other plastic materials and some metals which are cold-work-strengthenable are adapted to treatment by the present method and apparatus.

While certain embodiments of the invention have been described for purposes of illustration, it is to be understood that there may be various embodiments and modifications within the general scope of the invention.

I claim:

1. Apparatus for stretch-forming hollow flanged articles of cold-work-strengthenable plastic materials from sheet blanks which are thicker than the sidewall of the formed article, comprising in combination, a female die unit having a tubular portion with an annular axially open-ended peripherally confined blank-holding recess with a transverse seat at one end, annular power-actuated axially movable rim-engaging blank-clamping and compressing means arranged to enter and move telescopically through the recess above the blank-holding seat, the space between the blank seat and the clamping means being freely open inwardly for the full thickness of the rim to provide for holding the outer periphery of the blank rim against pull-in and for forcing rim material inward to the desired extent during article formation, and an independently power-actuated axially-movable forming plunger disposed within said rim-engaging means and movable through the annular blank-holding means and the tubular portion of the female die unit to stretch-form the inner portion of the rim-held blank to form the hollow article.

2. Apparatus for stretch-forming hollow flanged articles of cold-work-strengthenable plastics materials from sheet blanks which are thicker than the sidewall of the formed article, comprising in combination, a female die unit having a tubular portion with an annular transverse blank-holding seat at one end, annular power-actuated rim-engaging blank-clamping means for holding the outer periphery of the blank on said seat against pull-in during article formation, an independently power-actuated axially-movable forming plunger disposed within said rim-engaging means and movable through the annular blank-holding means and the tubular portion of the female die unit to stretch-form the inner portion of the rim-held blank to form the hollow article, the forward end of said forming plunger having clearance with the tubular portion of the female die unit at the inner edge of said recess seat of an amount to form an orifice of less width than the thickness of the blank to define the maximum sidewall thickness of the formed article and to entrain the major portion of the initially unthinned inner portion of the blank as inventory material on the end of the forming plunger to be pulled out radially into the sidewall of the forming article as the forming plunger advances into and through the female die unit.

3. Apparatus as set forth in claim 1, further characterized by the fact that said annular blank-clamping means extends interiorly beyond the inner side-wall of the tubular portion of the female die unit, and that said forming plunger is closely confined and guided at its forward end and rearwardly thereof by the interior sidewall of the annular clamping means to provide a fluid-confining and material-confining closure at the upper surface of the blank throughout the article forming action.

4. Apparatus for stretch-forming hollow flanged articles of cold-work-strengthenable plastic materials from sheet blanks which are thicker than the sidewall of the formed article, comprising in combination, a female die unit having a tubular portion with an annular transverse blank-holding seat at one end, annular power-actuated rim-engaging blank-clamping means for holding the outer periphery of the blank on said seat against pull-in during article formation, an independently power-actuated axially-movable forming plunger disposed within said rim-engaging means and movable through the annular blank-holding means and the tubular portion of the female die unit to stretch-form the inner portion of the rim-held blank to form the hollow article, and means for turning said annular rim engaging means circumferentially over the rim-engaged portion of the blank to impart peripheral flow and orientation to the annular flange of the article.

5. Apparatus as set forth in claim 1, which further comprises, means to rotate the annular rim-holding means about its axis while axial pressure is applied to impart peripheral flow and orientation in the annular flange and adjacent article sidewall.

6. Apparatus as set forth in claim 1, further characterized by the fact that said female die unit is made of laterally separable parts which carry said open-ended peripherally confined blank-holding recess seat.

7. Apparatus as set forth in claim 6, which further comprises, means to rotate the annular rim-holding means about its axis while axial pressure is applied to impart peripheral flow and orientation in the annular flange and adjacent article sidewall.

References Cited

UNITED STATES PATENTS

| 2,854,694 | 10/1958 | Munford. | |
| 2,547,331 | 4/1951 | Lent | 18—19 |
| 3,105,270 | 10/1963 | Fibish | 18—19 |
| 3,167,104 | 1/1965 | Wiley et al. | 18—19 |
| 3,183,292 | 5/1965 | Dvoracek | 18—2 XR |
| 3,203,218 | 8/1965 | Bolt et al. | 18—19 XR |
| 3,235,639 | 2/1966 | Knowles | 18—19 XR |
| 3,305,158 | 2/1967 | Whiteford. | |
| 3,315,313 | 4/1967 | Steigman | 18—19 |

WILLIAM J. STEPHENSON, Primary Examiner

U.S. Cl. X.R.

25—102